United States Patent
Yang et al.

(10) Patent No.: US 8,135,553 B2
(45) Date of Patent: Mar. 13, 2012

(54) METHOD FOR CLOCK CALIBRATION

(75) Inventors: Ganning Yang, Irvine, CA (US);
Ming-Chi Chen, Taipei County (TW)

(73) Assignee: Mediatek Inc., Hsinchu (TW)

( * ) Notice: Subject to any disclaimer, the term of this patent is extended or adjusted under 35 U.S.C. 154(b) by 889 days.

(21) Appl. No.: 12/183,275

(22) Filed: Jul. 31, 2008

(65) Prior Publication Data
US 2010/0029267 A1  Feb. 4, 2010

(51) Int. Cl.
*G01D 18/00* (2006.01)

(52) U.S. Cl. ............ 702/89; 702/85; 713/322; 713/400; 713/500; 455/208; 455/343.2; 455/343.4; 455/425; 455/574

(58) Field of Classification Search .......... 370/310, 370/311, 314, 318, 335, 516, 518; 455/127.1, 455/127.5, 343.1–343.6, 458, 502, 515, 522, 455/550.1, 572–574; 340/7.1, 7.32–7.34, 340/7.6–7.38; 713/300, 320–323, 500–503; 368/118, 120, 155, 156; 702/79, 85, 89
See application file for complete search history.

(56) References Cited

U.S. PATENT DOCUMENTS

| | | | |
|---|---|---|---|
| 5,995,820 A * | 11/1999 | Young et al. ............... | 455/343.1 |
| 6,016,312 A * | 1/2000 | Storm et al. ............... | 370/311 |
| 6,473,607 B1 * | 10/2002 | Shohara et al. ............ | 455/343.1 |
| 6,577,974 B2 * | 6/2003 | Ozaki ........................ | 702/89 |
| 6,639,957 B2 * | 10/2003 | Cahill-O'Brien et al. .... | 375/354 |
| 6,725,067 B1 * | 4/2004 | Marx et al. .................. | 455/574 |
| 6,950,673 B2 * | 9/2005 | Asada ........................ | 455/550.1 |
| 7,272,078 B1 * | 9/2007 | Haartsen .................... | 368/118 |
| 7,403,507 B2 * | 7/2008 | McDonough et al. ........ | 370/335 |
| 7,660,612 B2 * | 2/2010 | Bultan et al. ................ | 455/574 |
| 7,797,118 B2 * | 9/2010 | Ashburn et al. ............. | 702/89 |
| 7,881,895 B2 * | 2/2011 | Haartsen et al. ............. | 702/89 |

FOREIGN PATENT DOCUMENTS
CN  1777310  5/2006

OTHER PUBLICATIONS
English language translation of abstract of CN 1777310 (published May 24, 2006).

* cited by examiner

*Primary Examiner* — Anthony Addy
(74) *Attorney, Agent, or Firm* — Thomas|Kayden

(57) ABSTRACT

A method for clock calibration is provided. The method comprises receiving discontinuous reception period (DRX period) information from a base station, computing a calibration duration according to the discontinuous reception period and a clock error tolerance of a first clock, and when receiving paging information that informs of possible sent transmissions, calibrating the first clock with a second clock for a period of the calibration duration.

14 Claims, 4 Drawing Sheets

METHOD FOR CLOCK CALIBRATION

BACKGROUND OF THE INVENTION

1. Field of the Invention

The invention relates in general to wireless telecommunication systems, and in particular, to a method for clock calibration in a wireless telecommunication system.

2. Description of the Related Art

Wireless telecommunication systems provide voice, video, data, and signaling communication services between mobile stations, such as cellular phones, notebook computers, or personal digital assistants (PDA). The mobile stations employ portable power storage cells such as batteries, with inherently limited storage capacity, thus requiring effective power management solutions.

In one example of the power management solution, the mobile station runs at a low clock speed when inactive, referred to as power saving mode, and a high clock speed during normal mobile station operation, known as normal operation mode. FIG. 1 shows a waveform of a power consumption of a mobile phone before and during receiving paging channel data, where the x-axis represents time and y-axis represents amplitude of the power in voltage. The power consumption of the mobile phone varies with time as shown by the amplitude of the waveform. Most of the time, the mobile phone switches from a power saving mode to a normal operation mode at an idle period for receiving paging channel data, sometimes, the mode switching is caused by the request of upper level software. FIG. 1 illustrates the mobile phone initially operates at a power saving mode, and then switches to a normal operation mode for receiving paging channel data. The first peak indicates the mobile phone enters the settle time for initiating the oscillation of a high speed clock; this settle time usually lasts for 3 to 5 ms. The second peak is an interrupt indicating the mobile phone enters the normal operation mode, and power is drawn from the power supply to the microcontroller, base band and RF circuits to receive and process the data packets. When the mobile phone leaves the normal operation mode, the RF circuit is turned off, and then the high speed clock is also turned off. The power usage of a mobile station can be further reduced by decreasing the duration of the normal operation mode, or decreasing the power consumed during the normal operation mode and the power consumption due to current leakage during the power saving mode.

BRIEF SUMMARY OF THE INVENTION

A detailed description is given in the following embodiments with reference to the accompanying drawings.

A method for clock calibration is disclosed, comprising receiving discontinuous reception period (DRX period) information from a base station, computing a calibration duration according to the discontinuous reception period and a clock error tolerance of a first clock, and when receiving paging information that informs of possible sent transmissions, calibrating the first clock with a second clock for a period of the calibration duration.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
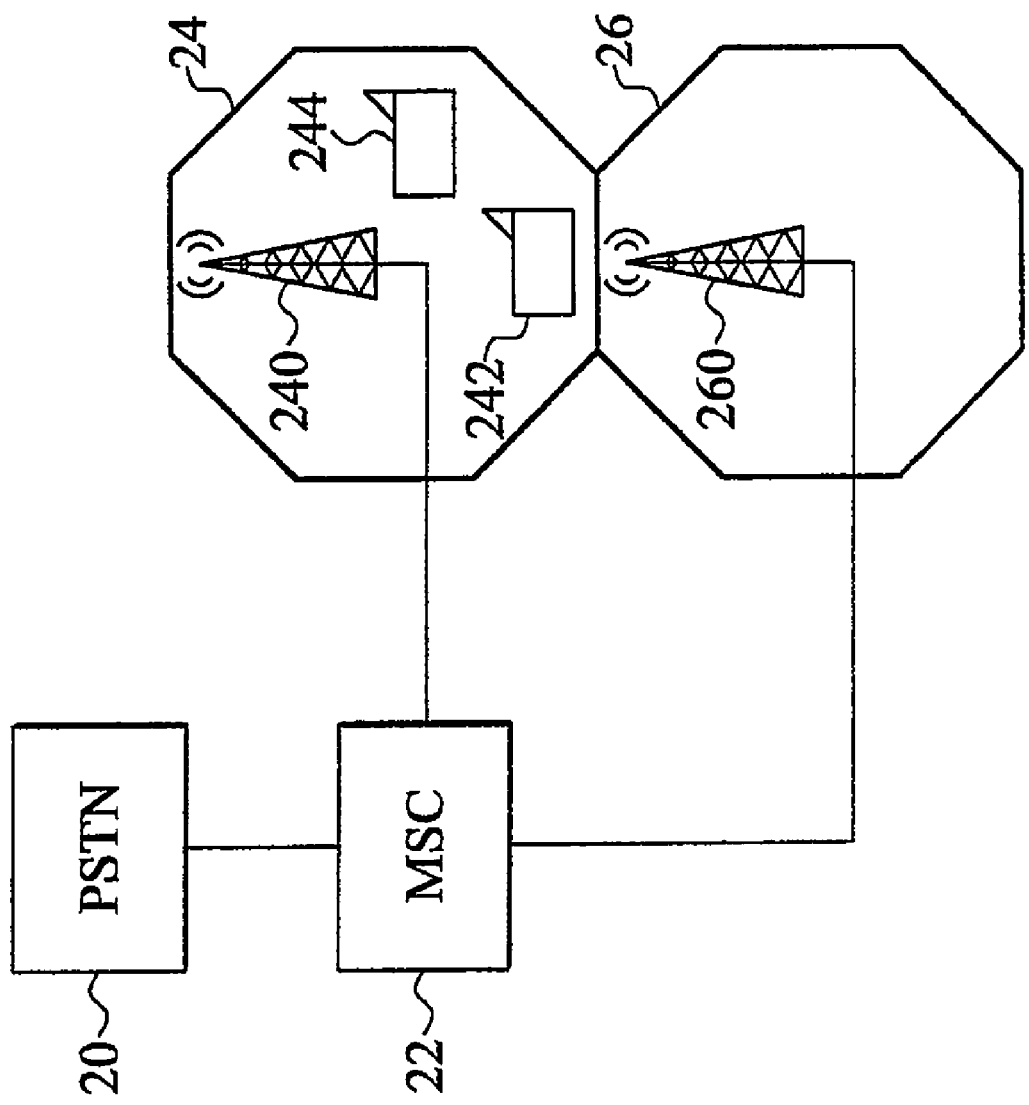
FIG. 2 is a block diagram of an exemplary wireless telecommunication system.

FIG. 2 is a block diagram of an exemplary wireless telecommunication system comprising a public switching telephone network (PSTN) 20, a Mobile Service Switching Centers (MSC) 22, and base station coverage 24 and 26. The PSTN 20 is coupled to the MSC 22, and subsequently to base station coverage 24 and 26.

In the exemplary embodiment, the wireless telecommunication system is a GSM system, the base station coverage 24 and 26 are provided by the base stations 240 and 260 to offer telecommunication services to the mobile phones 242 and 244. The MSC 22 routes telephone calls that may be voice or data messages from a call source to a call a destination through the PSTN 20. The base stations 240 and 260 allocate uplink or downlink RF channels for providing call services to the mobile phones in the coverage area. The base stations 240 and 260 broadcast paging information through a Paging Channel (PCH), indicating standby incoming calls or messages for the mobile phones 242 and 244. The paging information is broadcasted within base station coverage by a base station at a fixed interval defined by discontinuous reception period (DRX period) information. The DRX period information is transmitted to all mobile stations through a broadcast control channel (BCCH) by the base station, and the DRX period ranges from 0.5 s to 2 s in the GSM standard, determined by the network. For example, the base station 240 broadcasts the discontinuous reception period information to the mobile stations 242 and 244 through the BCCH channel, wherein the discontinuous reception period may be, for example, 0.5 s, thus informing that the paging information will be transmitted to the mobile stations 242 and 244 through the PCH Channel.

During the discontinuous reception period, the mobile stations 242 and 244 remain inactive in the power saving mode, operated by a low speed clock at 32768 Hz (32 KHz) to count the time since entering the power saving mode. When the accumulated time reaches the discontinuous reception period, the mobile stations 242 and 244 enter the normal operation mode to retrieve and process the paging information, operated by a high speed GSM clock. When the low speed clock is slower than 32768 Hz, the mobile station wakes up too late and misses incoming paging information, resulting in missed calls or missed messages. On the contrary, when the low speed clock is faster than 32768 Hz, the mobile station wakes up too early, thus consuming excessive power, resulting in less standby time and shorter battery life. Therefore, the mobile stations perform clock calibration for the low speed clock prior to the power saving mode to prevent the clock error of the low speed clock to be less than a predetermined clock error tolerance.

Figure 1:
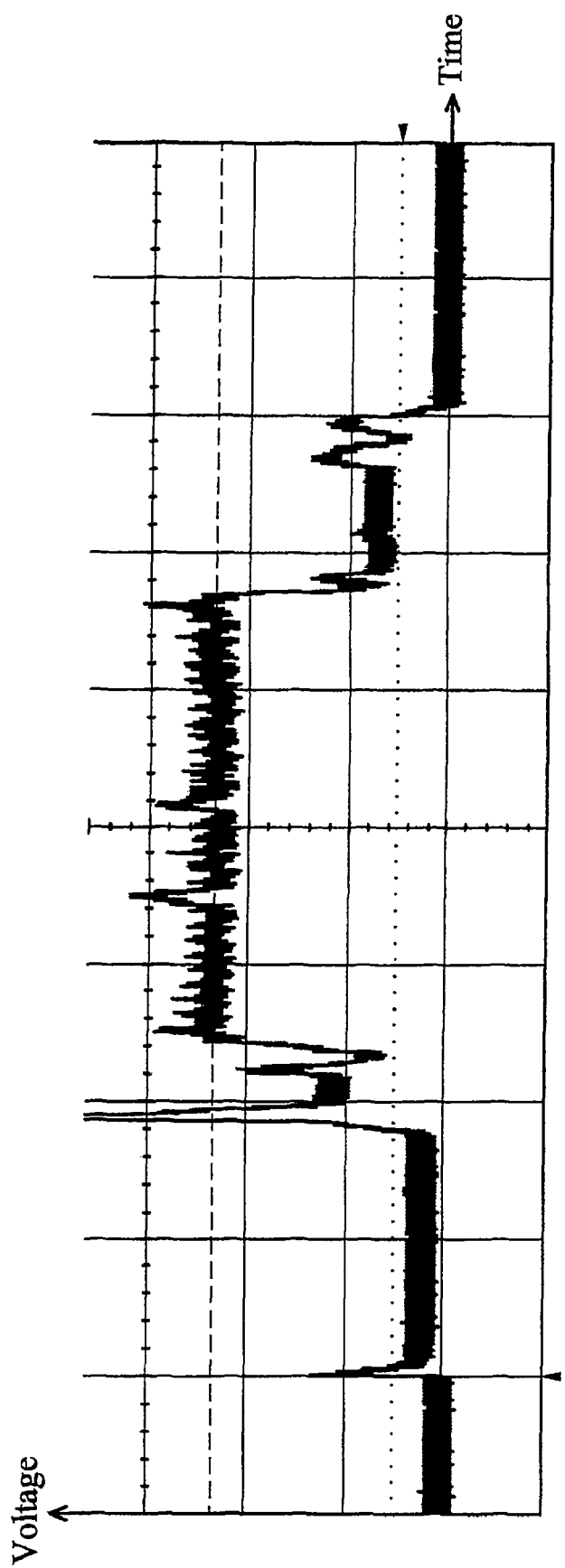
FIG. 1 shows a waveform of power consumption when receiving paging channel data by a mobile station.

The mobile station of FIG. 1 may operate in a second generation 2G or third generation 3G cellular telecom network. The 2G cellular telecom network includes a Global Standard for Mobile Communication (GSM), Interim Standard 95 (IS-95), Integrated Digital Enhanced Network (iDEN), Personal Digital Cellular (PDC), and Digital AMPS (D-AMPS) network. The 3G cellular telecom networks are defined by the IMT-2000 standard that includes a Wideband Code Division Multiple Access (W-CDMA), CDMA2000, TD-CDMA, Universal Wireless Communications (UWC), Digital Enhanced Cordless Telecommunications (DECT), and Worldwide Interoperability for Microwave Access (WiMAX) standard.

Figure 3:
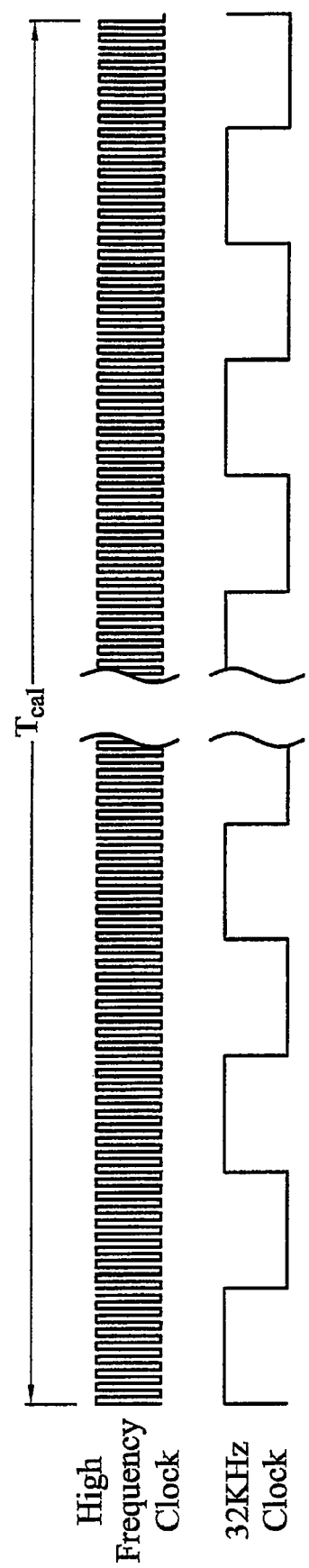
FIG. 3 shows a clock calibration scheme in a communication system.

FIG. 3 shows a clock calibration scheme in a communication system, employing a high frequency clock to calibrate the 32 KHz low frequency clock. The high frequency clock is typically a 2G clock (ex: 26 MHz) or 3G clock (ex: 30.72 MHz) operating in the normal operation mode. During clock calibration, the system counts a first predetermined number of clock pulses of the high frequency clock in a calibration duration $T_{cal}$, and adjusts the clock period of the 32 KHz clock such the 32 KHz counts a second predetermined number of clock pulses when the high frequency clock counts the first predetermined number of clock pulses. Increasing the calibration duration $T_{cal}$ also increases the accuracy of the calibration, since the sampling error of the high frequency clock is decreased. Taking the 3G/3.5G systems as an example, the high frequency clock is 30.72 MHz and the discontinuous reception period ranges from 0.64 s to 5.12 s. When the mobile phone uses the calibration duration $T_{cal}$ of 500 ms to calibrate the 32 KHz clock, the clock error is $(1/30.72\times10^6)/(500\times10^{-3})=0.065\times10^{-6}$. When the mobile phone uses the calibration duration $T_{cal}$ of 11 3G slots (7.333 ms) to calibrate the 32 KHz clock, the clock error is $(1/30.72\times 10^6)/(7.333\times10^{-3})=4.439\times10^{-6}$. A 3G mobile phone is capable of searching 3G data within a range of $\pm 128$ chips, or less than $\pm 128$ chips (depends on mobile phone's capability). Each chip has a time interval of 0.2604 us, thus for a DRX period of 5.12 s, the 3G mobile phone has a clock error tolerance of $(128*0.2604\times10^6)/5.12=6.51\times10^{-6}$.

A clock error of the 32K clock caused by quantization is accumulative and proportional to the time of entering the power saving mode, thus the larger the discontinuous reception period is, the higher the required accuracy of the low speed clock is. When the accumulative clock error is less than the clock error tolerance of the system, the mobile station is capable of receiving the paging channel data. For example, for the search window size of 128 chips and a DRX period of 5.12 s, the mobile station can retrieve 3G data if the accumulative error is less than $6.51\times10^{-6}$, i.e., the clock error given by the calibration duration $T_{cal}$ of 11 3G slots ($4.439\times10^{-6}$) is sufficient ($<6.51\times10^{-6}$) for 3G data retrieval. The longest discontinuous reception period has the strictest requirement for the 32 KHz clock accuracy, and typically uses a maximal calibration duration to provide the required clock accuracy. In some examples, the communication system uses the maximal calibration duration to calibrate the 32 KHz clock for any discontinuous reception period, thereby satisfying the strictest clock error requirement and providing the 32 KHz clock with a substantially identical clock error for use under any discontinuous reception period. However, the maximal calibration duration is usually much longer than the required time for receiving the paging information, thus mobile phones consume a considerable amount of power for the clock calibration.

In 2G/2.75G systems, a mobile phone spends around 20 ms for receiving each paging information, and around 500 ms for clock calibration of the 32 KHz clock, thus consuming 96% more power in comparison to only retrieving paging information. In a 3G/3.5G system, a mobile phone spends around 10 ms to retrieve the paging information. Thus, the long calibration duration, while providing high 32 KHz clock accuracy, constitutes a considerable portion of the total power usage of the mobile phone.

Figure 4:
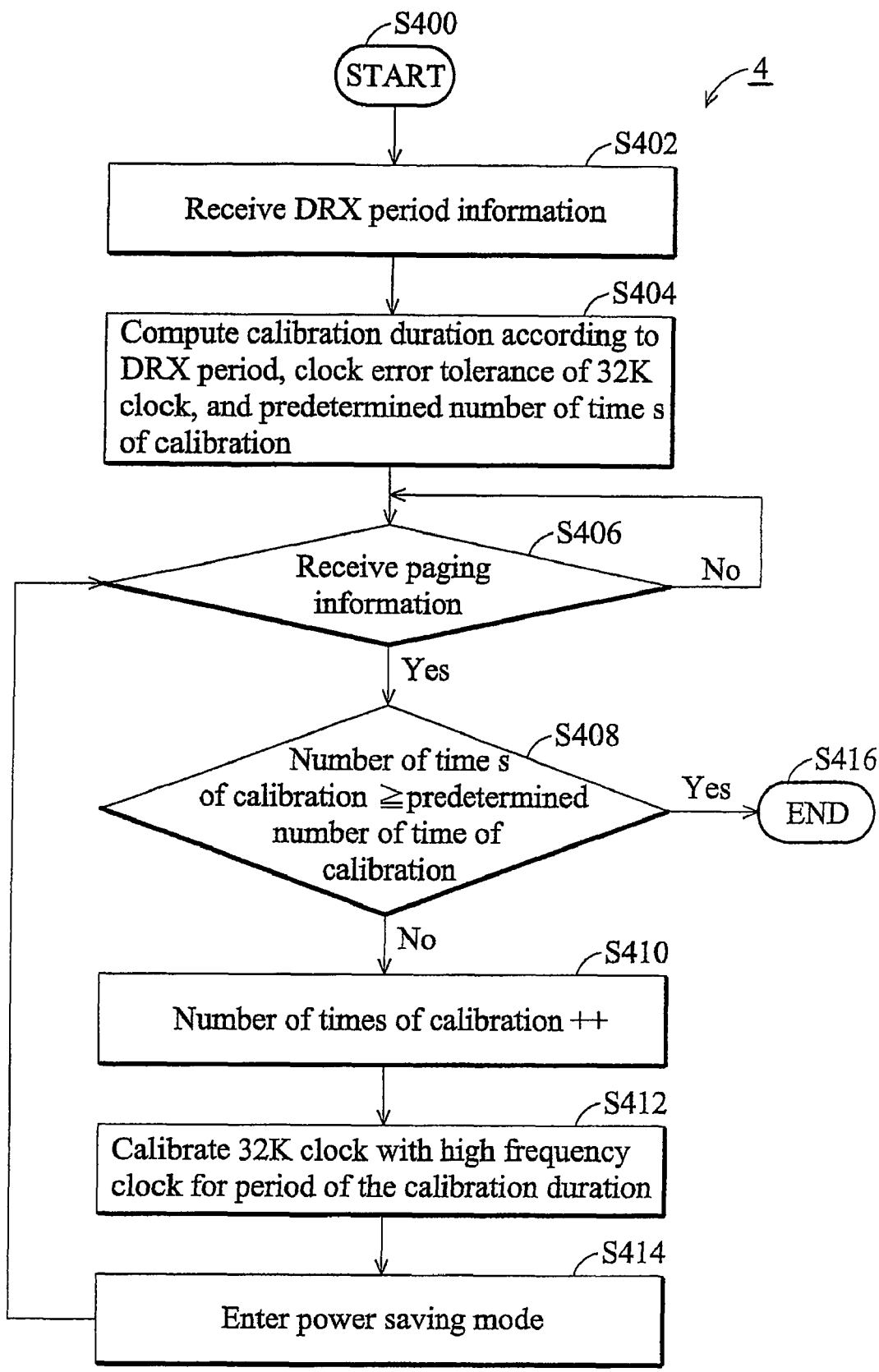
FIG. 4 is a flowchart of an exemplary method for clock calibration according to the invention.

FIG. 4 is a flowchart of an exemplary method for clock calibration in a mobile apparatus according to the invention. Note that the power usage due to the 32 KHz clock calibration is reduced.

Upon start of the clock calibration method (S400), the mobile apparatus resets all calibration parameters, and receives discontinuous reception period (DRX period) information from a base station (S402). The discontinuous reception period ranges from 0.5 s to 2 s in the 2G systems and 0.64 s to 5.12 s in the 3G systems. The calibration parameter includes the number of times of calibration which is to be reset to 0.

In step S404, the mobile apparatus computes a calibration duration $T_{cal}$ according to the discontinuous reception period and a clock error tolerance of a 32 KHz (first clock). The computation of the calibration duration comprises computing the calibration duration according to the discontinuous reception period and the predetermined number of times, such that a sum of all calibration durations $T_{cal\_sum}$ is less than a predetermined duration limit, for example, 15 s. For short discontinuous reception period, the calibration may be completed by averaging calibration results of a number of calibration segments, and the sum of all calibration durations $T_{cal\_sum}$ for all calibration segments is computed according the following equation:

$$E=(R_{chip}*T_{slp}*\sqrt{N})/(f_{cal}*T_{cal\_sum}) \quad [1]$$

Where E is the clock error, in term of number of chips;
$R_{chip}$ is the chip rate;
$T_{slp}$ is the discontinuous reception period;
N is the number of times of calibration;
$f_{cal}$ is the frequency of the high frequency clock; and
$T_{cal\_sum}$ is the sum of all calibration durations.

The number of times of calibration N is less than a predetermined number limit, for example, 8, i.e., the calibration may be broken up to 8 calibration segments. Each calibration segment may have the calibration duration $T_{cal}$ exceeding a minimal duration limit, for example, the minimal duration limit may be 11 slots for the 3G system. In some embodiments, the calibration duration is computed by searching at least a lookup table. Table 1 provides clock error E in a chip for a discontinuous reception period of 5.12 s (DRX=9) according to Equation [1], wherein the frequency of the high frequency clock is 30.72 MHz. Table 1 is sorted by the number of calibration segments N (1st column) and the calibration duration $T_{cal}$ (1st row).

TABLE 1

|   | 0.01 | 0.015 | 0.02 | 0.025 | 0.03 | 0.035 | 0.04 | 0.045 | 0.05 | 0.055 | 0.06 |
|---|---|---|---|---|---|---|---|---|---|---|---|
| 1 | 151.24 | 100.82 | 75.618 | 60.495 | 50.412 | 43.211 | 37.809 | 33.608 | 30.247 | 27.498 | 25.206 |
| 2 | 106.94 | 71.294 | 53.47 | 42.776 | 35.648 | 30.544 | 26.735 | 23.765 | 21.388 | 19.444 | 17.823 |
| 3 | 87.317 | 58.211 | 43.658 | 34.927 | 29.106 | 24.948 | 21.829 | 19.404 | 17.463 | 15.876 | 14.553 |

TABLE 1-continued

| | 0.01 | 0.015 | 0.02 | 0.025 | 0.03 | 0.035 | 0.04 | 0.045 | 0.05 | 0.055 | 0.06 |
|---|---|---|---|---|---|---|---|---|---|---|---|
| 4 | 75.618 | 50.412 | 37.809 | 30.247 | 25.206 | 21.605 | 18.905 | 16.804 | 15.124 | 13.749 | 12.603 |
| 5 | 67.635 | 45.09 | 33.818 | 27.054 | 22.545 | 19.324 | 16.909 | 15.03 | 13.527 | 12.297 | 11.273 |
| 6 | 61.742 | 41.161 | 30.871 | 24.697 | 20.581 | 17.641 | 15.436 | 13.721 | 12.348 | 11.226 | 10.29 |
| 7 | 57.162 | 38.108 | 28.581 | 22.865 | 19.054 | 16.332 | 14.291 | 12.703 | 11.432 | 10.393 | 9.527 |
| 8 | 53.47 | 35.647 | 26.735 | 21.388 | 17.823 | 15.277 | 13.368 | 11.882 | 10.694 | 9.7219 | 8.9117 |

The mobile apparatus may select the number of calibration segments N and the calibration duration $T_{cal}$ according to Table 1 to accomplish a desirable clock error tolerance. In the case for clock error tolerance of 20 chips, the mobile apparatus may select the number of calibration segments N of 2, wherein each calibration segment has the calibration duration $T_{cal}$ of 0.055 s, to provide the clock error E of 19.444 chips, satisfying the requirement of the clock error tolerance of 20 chips. Alternatively, the mobile apparatus may select the number of calibration segments N of 8, wherein each calibration segment has the calibration duration $T_{cal}$ of 0.03 s, to provide the clock error E of 17.823 chips, also satisfying the requirement of the clock error tolerance of 20 chips.

In step S406, the mobile apparatus enters the normal operation mode to check whether paging information that informs about incoming calls and messages is received. If so, the clock calibration method then goes to step S408 for 32 KHz clock calibration, if not, the mobile apparatus returns to step S406 to receive the incoming paging information.

In step S408, the mobile apparatus determines whether the number of times of calibration is less than the predetermined number of times of calibration, continues the clock calibration process if the number of times of calibration is less than the predetermined number of time of calibration (S410), and exits the clock calibration process if otherwise (S416). The mobile apparatus performs the first clock calibration for the predetermined number of times of calibration. The predetermined number of times of calibration is 1 when the discontinuous reception period exceeds or equals to a DRX period limit. For example, a DRX period limit may be 2.56 s, so that the 32 KHz clock calibration is performed for only 1 calibration duration for any discontinuous reception period exceeding 2.56 s. The calibration may be broken into a number of calibration segments when the discontinuous reception period is less than the DRX period limit, wherein each calibration segment has equal or different calibration durations, and the sum of all calibration durations is $T_{cal\_sum}$.

In step S410, the mobile apparatus increments the number of times of calibration by 1

In step S412, the mobile apparatus calibrates the first clock (32 KHz) with a high frequency clock (second clock) for a period of the calibration duration when receiving paging information that informs of possible sent transmissions. The 32 KHz clock is active during the discontinuous reception period to utilize original awake duration of normal mode, and the high frequency clock (for example, 2G or 3G clock) is inactive during the discontinuous reception period.

In step S414, the mobile apparatus enters a power saving mode for a period defined by the DRX information, then wakes up to the normal operation mode to check for the next paging information (S406) until the calibration process is complete.

Since the calibration is broken down into a number of calibration segments that can be executed with paging information retrieval, a long period for a one-time calibration can be avoided. Because the paging information has to be retrieved on a regular basis, independent of the calibration process, the power usage of the paging information retrieval is fixed. By breaking the calibration into a number of short calibration segments that can be executed while retrieving the paging information, the power consumption of the mobile apparatus may not increase due to the calibration process, thus this is a power efficient way to perform 32 KHz clock calibration.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for clock calibration, comprising:
    receiving discontinuous reception period (DRX period) information from a base station;
    computing a calibration duration according to the discontinuous reception period and a clock error tolerance of a first clock;
    upon receiving paging information that informs of possible sent transmissions, calibrating the first clock with a second clock for a period of the calibration duration;
    performing the calibration for a predetermined number of times, and
    wherein the computation of the calibration duration comprises computing the
        calibration duration according to the discontinuous reception period, the clock error tolerance of a first clock, and the predetermined number of times of calibration, and a sum of all calibration durations is less than a predetermined duration limit.

2. The method of claim 1, wherein the predetermined number of times is 1 when the discontinuous reception period exceeds a DRX period limit.

3. The method of claim 1, wherein the predetermined number of times of calibration is less than a predetermined number limit.

4. The method of claim 1, further comprising averaging results of the calibrations.

5. The method of claim 1, wherein the first clock is active during the discontinuous reception period, and the second clock is inactive during the discontinuous reception period.

6. The method of claim 1, wherein the calibration duration exceeds a minimal duration limit.

7. The method of claim 1, wherein the calibration duration is computed by searching a lookup table.

8. A wireless telecommunication apparatus with a first clock and a second clock, and the second clock has a faster clock speed than the first clock, the wireless telecommunication apparatus comprising:
    a receiver, receiving discontinuous reception period (DRX period) information from a base station;

a decision unit, computing a calibration duration according to the discontinuous reception period and a clock error tolerance of the first clock; and a calibration unit, upon receiving paging information that informs of possible sent transmissions, calibrating the first clock with the second clock for a period of the calibration duration, wherein the calibration unit performs the calibration for a predetermined number of times, and the computation of the calibration duration comprises computing the calibration duration according to the discontinuous reception period, the clock error tolerance of a first clock, and the predetermined number of times of calibration, and a sum of all calibration durations is less than a predetermined duration limit.

9. The wireless telecommunication apparatus of claim 8, wherein the predetermined number of times is 1 when the discontinuous reception period exceeds a DRX period limit.

10. The wireless telecommunication apparatus of claim 8, wherein the predetermined number of times of calibration is less than a predetermined number limit.

11. The wireless telecommunication apparatus of claim 8, wherein the calibration unit averages results of the calibrations.

12. The wireless telecommunication apparatus of claim 8, wherein the first clock is active during the discontinuous reception period, and the second clock is inactive during the discontinuous reception period.

13. The wireless telecommunication apparatus of claim 8, wherein the calibration duration exceeds a minimal duration limit.

14. The wireless telecommunication apparatus of claim 8, wherein the calibration duration is computed by searching a lookup table.

* * * * *